United States Patent [19]

Burke, Jr.

[11] 4,230,393
[45] Oct. 28, 1980

[54] TWO-AXIS OPTICAL SCANNER

[75] Inventor: Edward F. Burke, Jr., Reading, Mass.

[73] Assignee: MFE Corporation, Salem, N.H.

[21] Appl. No.: 929,520

[22] Filed: Jul. 31, 1978

[51] Int. Cl.³ .............................................. G02B 27/17
[52] U.S. Cl. .................................... 350/6.5; 358/199; 350/285
[58] Field of Search ....................... 350/6.5, 6.6, 6.9, 6, 350/6.1, 285; 358/199, 206, 208; 356/169

[56] References Cited

U.S. PATENT DOCUMENTS

| 3,087,373 | 4/1963 | Poor et al. | 350/6.6 |
| 3,700,304 | 10/1972 | Dostal et al. | 350/6.1 |

FOREIGN PATENT DOCUMENTS 458800 3/1975 U.S.S.R. .................................. 350/285

Primary Examiner—John K. Corbin
Assistant Examiner—B. W. de los Reyes
Attorney, Agent, or Firm—Cesari and McKenna

[57] ABSTRACT

An optical scanner capable of scanning parallel to two intersecting axes. The scanner comprises a single electromechanical transducer and a compliant link interconnecting the transducer with an optical element to which the two-axis movement is to be imparted. The link is selectively compliant to two planes containing the two axes and it is oriented to receive from the transducer force components in both planes. The transducer is driven at the frequencies of the resonances associated with the link compliances and the masses involved therewith. The link thereby imparts amplified motion to the optical element simultaneously in both planes, the resulting path described by the element thus being a Lisssajous pattern.

6 Claims, 5 Drawing Figures

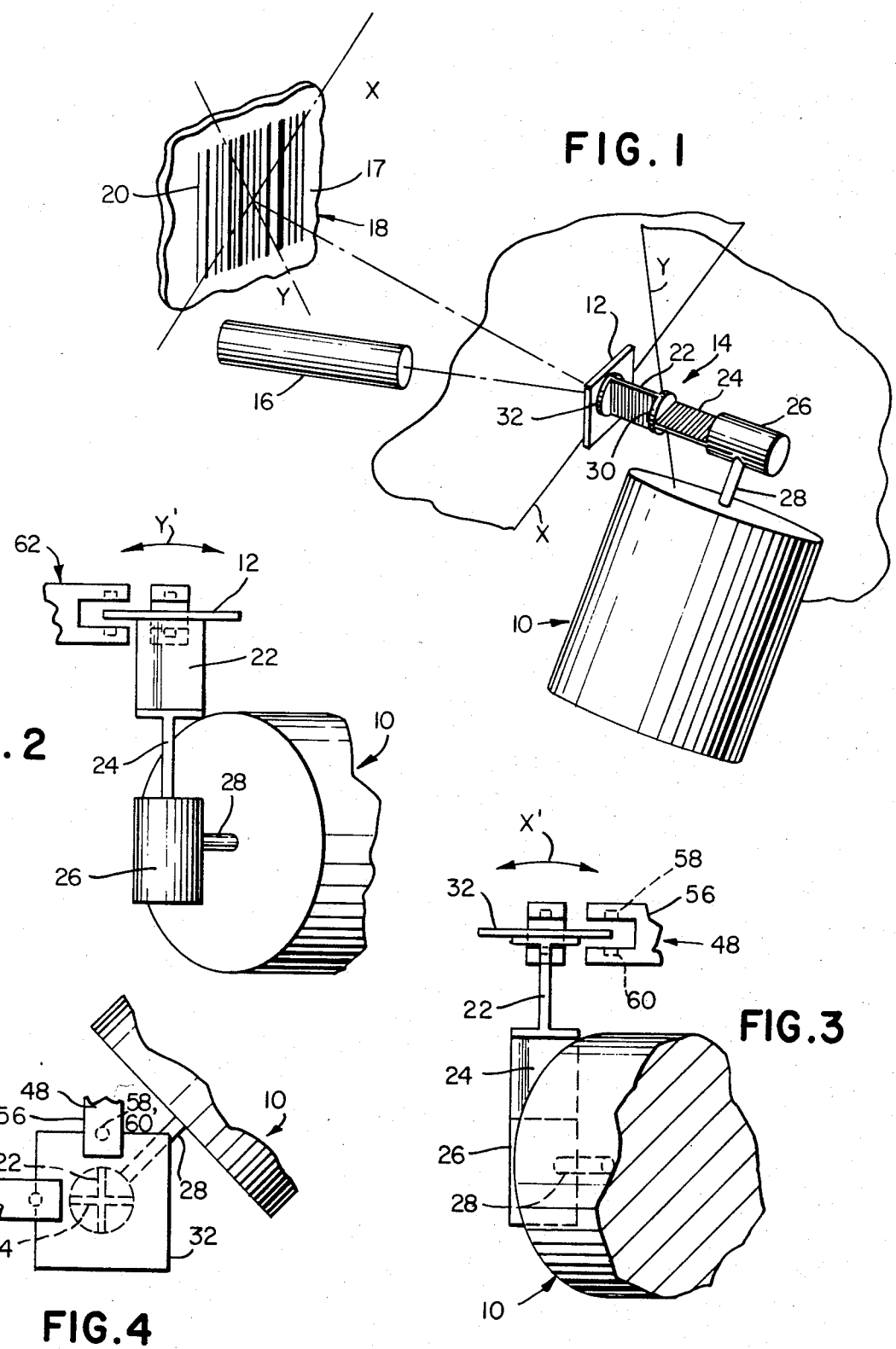

TWO-AXIS OPTICAL SCANNER

BACKGROUND OF THE INVENTION

This invention relates to a novel two-axis scanner. More specifically, it relates an optical scanner, driven by a single transducer, that scans a predetermined area.

Optical scanners are used in a variety of applications for the detection of information in a field of view. An important application is the sensing of data that has been imprinted on a surface in coded form, an example being the bar code imprinted on grocery store packages to identify the contents and the sources thereof. A typical scanner comprises a light source, a mirror positioned to reflect a beam of light from the source onto the field in which the data is to be sensed and an optical detector that responds to light reflected from the field of view. The mirror is mechanically connected to an electromechanical transducer that oscillates the mirror about a rotational axis and thereby causes the light beam to sweep back and forth so that the sensor repeatedly receives light reflected from a sequence of points along a line. The sensor thus provides an electrical signal corresponding with the imprinted data scanned by the light beam.

In some applications the light beam must be moved in two directions so as to scan an area instead of a single line. For example, it may be desirable to scan in a raster pattern comprising a series of substantially parallel lines. Alternatively, it may be desirable to scan along pairs of mutually orthoganal curves constituting a Lissajous pattern or similar configuration. A pattern of this latter type is useful in reading the aforementioned bar codes on packages, since it ensures that, by moving along a number of lines having different positions and orientations, the scanning beam will, during at least some of its sweeps, traverse all of the bars in the code despite the essentially random orientations of the bar codes with respect to the corresponding surface of the scanner.

Prior to the present invention, mechanical scanning along two axis has been accomplished primarily in two ways. In one system a beam is reflected from a mirror that rotates to move the beam along a first axis and is then reflected again from a second mirror that rotates in a plane orthogonal to the first plane. The twice-reflected beam thus moves in directions parallel to both planes and thereby scans an area in a field of view. In a sense the system comprises two complete single-axis scanners and thus is burdened with the cost and bulk of two scanners, together with the costs involved in aligning the scanners in a single optical system.

Another two-axis system employs a single mirror that is mounted on a first transducer for rotation in a first plane. The entire mirror-transducer assembly is mounted for rotation, in an orthogonal plane by a second transducer. The combined motion of the two transducers thus causes the mirror to rotate in both planes provide the desired area scanning function. Again the system is characterized by relatively high cost because of the need for two transducers, one of which must move the relatively large mass of the other transducer.

SUMMARY OF THE INVENTION

It is a principle object of the invention to provide a two-axis scanner that is compact and low in cost.

Another object of the invention is to provided a two-axis scanner that is reliable in operation.

Other objects of the invention will in part be obvious and will in part appear hereinafter.

A scanner embodying the invention employs a single optical element such as a mirror or the like that is driven by a single transducer for reciprocation in mutually orthogonal planes. The optical element is mounted on one end of a flexure that has a first bending mode for bending in one plane and a second bending mode for bending in a plane perpendicular to the first plane. The opposite end of the flexure is vibrated back and forth in a transverse plane that intersects both of the flexure planes and preferably is oriented at 45° with respect to both of those planes. Accordingly, a vibrational component is imparted to the flexure in both of its bending modes. The flexure thus undergoes flexural vibrations in both the flexure planes and thereby imparts the corresponding two-axis motion to the optical element mounted thereon.

Each of the two bending modes of the flexure is characterized by a resonant frequency determined by the spring constant of that mode and the vibrated mass. In general, the spring constants of the two modes will be different and they will therefore have different resonant frequencies. The transducer that vibrates the flexure is powered by an electrical input consisting of components at both those frequencies and therefore the flexure resonates in both modes of vibration. This contributes to the efficiency of operation and furthermore it serves to isolate each mode from the signal component driving the other mode. Specifically, the two resonances are characterized by a relatively high Q and, therefore, if the two resonant frequencies are sufficiently separated, e.g. 350 Hz and 1000 Hz, each mode will be insensitive to the frequency component used to drive the other mode.

Since the scanner has but one optical element and a single transducer it is compact and has a relatively low cost. Furthermore, since all relative motion is accomplished by flexure instead of sliding or rolling displacement it has minimal wear and is therefore characterized by a high degree of reliability.

BRIEF DESCRIPTION OF THE DRAWINGS

FIG. 1 is a simplified perspective view of a scanner embodying the invention, showing the scanner in use to sense bar-coded information;

FIG. 2 is an end view of the scanner of FIG. 1, taken at an angle of 45° with respect to the shaft of the driving transducer;

FIG. 3 is another end view taken at a direction perpendicular to the view in FIG. 2;

FIG. 4 is an end view of the mirror and associated parts, taken along line 4—4 of FIG. 2.

DETAILED DESCRIPTION OF THE INVENTION

Figure 5:
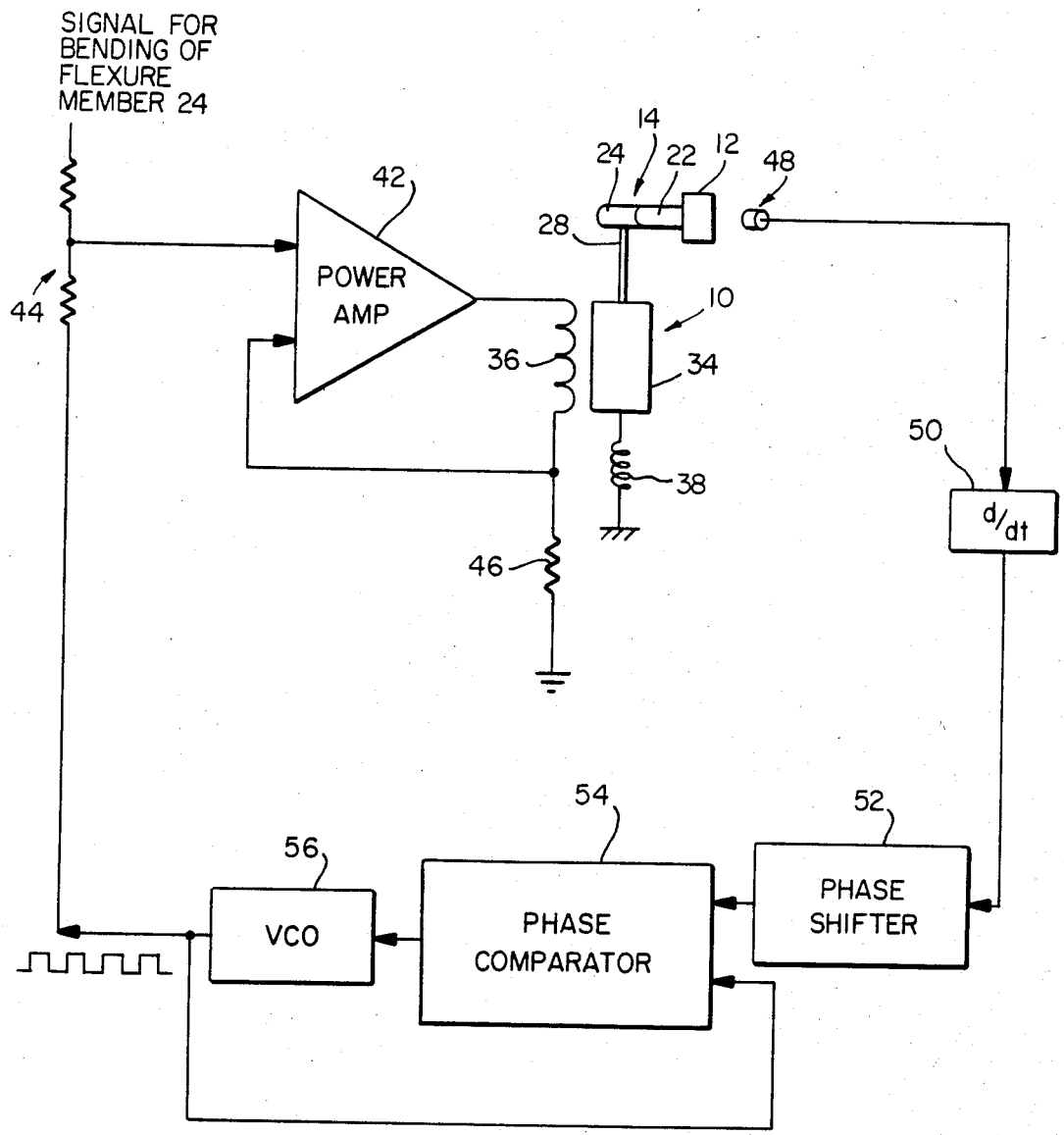
FIG. 5 is a schematic diagram illustrating the preferred mode of powering the scanner.

As shown in FIG. 1 a scanner incorporating the invention includes a limited-rotation electromechanical transducer 10 arranged to rotate a mirror 12 by means of an intervening flexure link 14. The mirror 12 reflects a beam from a light source 16 to a surface 17 of a package 18 or the like on which is imprinted bar-coded information in area 20. In order to be sure that the beam traverses all of the bar-coded information regardless of the orientation of the area 20 on the surface 17, it is desirable that the mirror 20 sweep the beam with movements having varying components along a pair of mutually orthogonal axes, e.g. the x and y axes on the surface 17. The illustrated scanner therefore sweeps the beam in a Lissajous pattern in which it crisscrosses the area 20 with a substantial number of lines having different positions and having orientations parallel to a pair of orthogonal axes designated as "x" and "y" in FIG. 1.

To accomplish this two-axis beam movement, the mirror 12 must rotate in planes parallel to the x and y axes, these planes being denoted herein as "X" and "Y," respectively. I provide this mirror movement by means of the link 14, which comprises a pair of flexure members 22 and 24. The member 22 provides for mirror rotation in the X plane and the member 24 provides for mirror rotation in the Y plane.

More specifically, the link 14 comprises an end fitting 26 to which an end of the flexure member 24 is attached. The fitting 26 secures the link 14 to the shaft 28 of the motor 10, thereby to impart to the link the forces or torques exerted by the shaft. A coupling plate 30 is affixed to the outer end of the flexure member 24 and the inner end of the flexure member 22 in turn, is affixed to the plate 30. A second plate 32, affixed to the outer end of the flexure member 22, supports the mirror 12.

The flexure members 22 and 24 are in the form of flat, relatively thin strips that function as leaf springs. The member 22 is oriented perpendicular to the X plane so as to bend in that plane and be rigid in the Y plane. Conversely, the member 24 is oriented perpendicular to the Y plane so as to bend in that plane and be rigid in the X plane. Thus, combined flexure of the members 22 and 24 provides the desired rotation of the mirror 12 in the X and Y planes.

The link 14 is so oriented with respect to the motor shaft 28 that torque exerted by the shaft 28 provides a force at the end fitting 26 having components in both the X and Y planes. Thus oscillatory rotation of the shaft 28 results in vibrations of both the flexure members 22 and 24 in the planes in which they are capable of bending.

The force component that causes flexure of the outer flexure member 22 is, of course, transmitted to the member 22 through the flexure member 24 and coupling plate 30. The member 24 is preferably orthogonal to the member 22 and is thus rigid with respect to the direction of flexure of the member 22. Consequently, the vibrational component to which the flexure member 22 is sensitive is transmitted by the member 24 as though the member 24 were a rigid interconnecting bar. This component has the resonance frequency associated with bending of the member 22. Accordingly, the outer end of the member 22 vibrates with a substantially greater amplitude than its inner end, so as to provide the desired rotation of the plate 32 and mirror 12 in the X plane.

Conversely, the flexure member 22 is rigid with respect to the direction of flexure of the member 24. Therefore, the vibrational components that cause bending of the member 24 do not cause bending of the member 22. The member 22 thus acts as a rigid bar to transmit to the plate 32 and mirror 12 the vibrational component of the member 24 in the Y plane. This component has the the resonance frequency associated with bending of the member 24. The outer end of the member 24 therefore vibrates in the Y plane with a substantially greater amplitude than the inner end of that member and this provides the desired amplitude of rotation of the plate 32 and mirror 12 in the Y plane.

The system can be powered in an open-loop arrangement in which the transducer 10 receives an input current that consists of components at the two resonance frequencies associated with the bending of the flexure members 22 and 24 in the X and Y planes, respectively. The output shaft 28 thus undergoes rotational vibration at these two frequencies and the inner end of the flexure member 24 is vibrated accordingly. Assuming a reasonably high Q for the two resonances, each flexure member will bend only at the frequency of its resonance, thereby providing the combined X- and Y- plane rotation of the mirror 12 as described above.

I prefer, however, to use a closed-loop arrangement as depicted in FIG. 5. This figure illustrates the circuit for driving the transducer 10 at the resonance frequency associated with bending of one of the flexure members, e.g., the member 22. A similar circuit is used to provide the transducer input for bending of the flexure member 24.

The transducer 10 shown in FIG. 5 is a moving iron type, limited-rotation transducer having an armature 34 to which torque is applied by means of current through a control winding 36. The armature 34 rotates against a counter torque provided by a spring 38. A generator 40 provides an output at the resonance frequency associated with bending of the flexure member 24, this output being applied to a power amplifier 42 by way of a summing circuit 44. The power amplifier 42, in turn, provides the input current to the control winding 36.

It is desirable that the torque applied to the armature 34 correspond with the output voltage of the generator 40. Accordingly, since the torque is proportional to the current in the winding 36, the amplifier 42 is connected to provide an output current proportional to its input voltage from the generator 40. This is accomplished by means of a negative feedback arrangement in which the voltage across a resistor 46 in series with the winding 36 is applied to the input of the amplifier 42.

The generator 40 includes a position sensor 48 that senses the X-plane position of the mirror 12, i.e., with respect to the vibrations of the mirror provided by the flexure member 22. The sensor 48 is described below in detail in connection with FIGS. 2–4. The output of the sensor 48 is differentiated by a differentiator 50 to provide a velocity signal indicatve of the velocity of the mirror 12 in the X plane. This velocity signal, after phase correction, if needed, by a phase compensation circuit 52, is applied as one input of a phase comparator 54. The other input of the comparator 54 is provided by a voltage-controlled oscillator 56. The comparator 54 provides an output indicative of the difference in phase between the velocity signal from the differentiator 50 and the output of the oscillator 56 and this output is the control signal for the oscillator 56.

The output of the oscillator 56, which is also the output of the generator 40, is thus forced into phase with the velocity signal and thus the torque applied to the motor armature 34 is therefore in phase with the velocity component of the mirror 12 in X plane. This is the condition that obtains at the resonance associated with bending of the flexure member 22 in that plane. Accordingly, the circuit maintains the resonance condition in spite of variations in the resonance frequency due to such factors as temperature changes and aging, for example.

As best seen in FIG. 3, the position sensor 48 comprises a bracket 56 that supports both a light emitter 58 and a light sensor 60 disposed to receive a beam of light from the emitter 58. The bracket 56 is positioned so that an edge portion of the plate 32 intercepts part of the light beam from the emitter 58. The portion of the beam intercepted by the plate 32 varies as the plate 32 moves back and forth in the direction of the arrow x' in response to bending of the flexure member 22. The amount of light reachng the sensor 60 is thus an indication of the X-plane position of the plate 32 and the mirror 12 mounted thereon. The electrical output of the sensor 60 is a corresponding electrical indication of that position.

As shown in FIG. 2, a second position sensor 62 senses the Y-plane position of the plate 32. Specifically, the sensor 62 provides an electrical signal corresponding to variations in the X-plane position of the mirror 12 resulting from bending of the flexure member 24 as indicated by the arrow y'. The output of the position sensor 62 is used in a generator indentical with the generator 40 of FIG. 5 and having an output that is applied to the power amplifier 42 by way of the summing circuit 44.

With the foregoing arrangement the scanner sweeps over the area 20 in a Lissajous pattern. Preferably the ratio of the number of lines in the pattern parallel to the respective x and y axes approximates the ratio of length to width of the area 20. This is accomplished by constructing the flexure link so that the two resonance frequencies associated with the flexure members 22 and 24 are in approximately the same ratio. The resonance frequencies depend, in essence, on the effective masses and compliances associated with the resonances. The desired frequencies can therefore be obtained by designing the flexure members with appropriate materials, lengths, and thicknesses and by suitable selection of the masses associated with the resonances.

It can be shown that by powering the transducer 10 at the resonance frequencies associated with the bending of the flexure members 22 and 24 one can obtain substantial reciprocatory motion of the mirror 12 with negligible movement of the transducer shaft 28. Moreover the elements connected to the shaft 28 impart the desired movement to the mirror 12 through flexure only, without the need for bearings or other similar wear-causing mechanisms. These factors contribute to long life and high reliability. Moreover, the use of a single electro-mechanical transducer provides a relatively low cost and contributes, along with the bending arrangement involving the link 14, to a desirably small size of the scanner.

What is claimed as new and desired to be secured by Letters Patent of the United States is:

1. An optical scanner comprising:
   A. a transducer providing a mechanical reciprocating output,
   B. an optical element,
   C. a link having a first end connected to said transducer and a second end connected to said optical element to impart motion to said optical element in response to the output of said transducer,
      i. said link being compliant in a finite number, not less than two, of intersecting planes,
      ii. said link and the masses associated therewith, including the mass of said optical element, having resonances associated with the compliances thereof,
      iii. said link being oriented to receive at said first end vibrating components from said transducer in each of said planes, thereby to provide simultaneous flexure of said link in each of said planes and simultaneous movement of said optical element in said planes.

2. The scanner defined in claim 1 including means for powering said transducer simultaneously with the frequency of each of said resonances.

3. The scanner defined in claim 1
   A. in which said link comprises first and second flexure members,
   B. including means connecting a first end of said first flexure member to said transducer to receive the output of said transducer,
   C. including means connecting a first end of said second flexure member to the second end of said first flexure member,
   D. including means connecting said output element to the second end of said second flexure member,
   E. in which each of said flexure members is oriented to flex solely in one of said planes, and
   F. in which said link is oriented to received force components from said transducer in both said planes.

4. The scanner defined in claim 3 in which each of said interconnecting means is rigid.

5. The scanner defined in claim 3 in which said transducer is a rotary transducer connected to apply a torque to said first end of said first flexure member.

6. The scanner defined in any of claims 1–5 in which the link is compliant in at most two orthogonal intersecting planes.

* * * * *